United States Patent
Song

(10) Patent No.: US 9,643,377 B2
(45) Date of Patent: May 9, 2017

(54) FLOOR PLANK WITH FOAM CORE

(71) Applicant: Jincheng Song, Zhangjiagang (CN)

(72) Inventor: Jincheng Song, Zhangjiagang (CN)

(73) Assignee: Tower IPCO Company Limited (IE)

( * ) Notice: Subject to any disclaimer, the term of this patent is extended or adjusted under 35 U.S.C. 154(b) by 0 days.

(21) Appl. No.: 14/846,407

(22) Filed: Sep. 4, 2015

(65) Prior Publication Data

US 2015/0375471 A1     Dec. 31, 2015

Related U.S. Application Data

(63) Continuation-in-part of application No. 14/260,958, filed on Apr. 24, 2014, now Pat. No. 9,133,626.

(30) Foreign Application Priority Data

May 2, 2013  (CN) .......................... 2013 1 0158946
May 2, 2013  (CN) .......................... 2013 2 0232217

(51) Int. Cl.
*B32B 3/00*       (2006.01)
*B32B 3/06*       (2006.01)
(Continued)

(52) U.S. Cl.
CPC ................. *B32B 3/06* (2013.01); *B32B 3/26* (2013.01); *B32B 15/046* (2013.01); *B32B 27/065* (2013.01); *B32B 27/30* (2013.01); *B32B 27/32* (2013.01); *B32B 27/34* (2013.01); *B32B 27/40* (2013.01); *B32B 37/02* (2013.01); *B32B 37/182* (2013.01); *E04F 13/0875* (2013.01);
(Continued)

(58) Field of Classification Search
CPC ....... B32B 27/065; B32B 27/30; B32B 27/32; B32B 27/34; B32B 27/36; B32B 2419/04; B32B 2607/00; B32B 2307/554; B32B 2307/56; B32B 2327/06; B32B 37/182
See application file for complete search history.

(56) References Cited

U.S. PATENT DOCUMENTS 3,016,317 A   1/1962  Brunner
6,933,043 B1  8/2005  Son et al.
(Continued)

FOREIGN PATENT DOCUMENTS

CN    101824198 A    8/2010
EP     0830419 A1    3/1998
(Continued)

*Primary Examiner* — Elizabeth Mulvaney
(74) *Attorney, Agent, or Firm* — Rodman & Rodman

(57) ABSTRACT

The floor member has a closed-cell foam core that constitutes approximately 50% of the overall thickness of the floor member. All constituents of the floor member, including a design layer, wear layer and resilient foam plastic underlayer, are highly water resistant and essentially water repellant. The closed-cell foam core is relatively lightweight and the floor member is also relatively lightweight compared to equally dimensioned floor planks formed exclusively of solid laminated plastic materials or wood-based laminated materials. The floor member has edge connecting means for convenient floating floor installation without the need to adhere the floor member to a floor base. The floor member is also easy to handle to permit a do-it-yourselfer to install a floor covering with the floor member.

20 Claims, 10 Drawing Sheets

(51) Int. Cl.

| | | |
|---|---|---|
| *B32B 15/04* | (2006.01) | |
| *B32B 27/06* | (2006.01) | |
| *B32B 27/30* | (2006.01) | |
| *B32B 27/32* | (2006.01) | |
| *B32B 27/34* | (2006.01) | |
| *B32B 27/40* | (2006.01) | |
| *B32B 37/02* | (2006.01) | |
| *B32B 3/26* | (2006.01) | |
| *E04F 13/08* | (2006.01) | |
| *E04F 13/18* | (2006.01) | |
| *E04F 15/02* | (2006.01) | |
| *E04F 15/10* | (2006.01) | |
| *B32B 37/18* | (2006.01) | |
| *B32B 37/12* | (2006.01) | |
| *B32B 38/04* | (2006.01) | |

(52) U.S. Cl.
CPC ........ *E04F 13/0885* (2013.01); *E04F 13/185* (2013.01); *E04F 15/0215* (2013.01); *E04F 15/02033* (2013.01); *E04F 15/105* (2013.01); *E04F 15/107* (2013.01); *B32B 37/12* (2013.01); *B32B 38/04* (2013.01); *B32B 2255/10* (2013.01); *B32B 2266/0235* (2013.01); *B32B 2305/022* (2013.01); *B32B 2307/102* (2013.01); *B32B 2307/412* (2013.01); *B32B 2309/105* (2013.01); *B32B 2419/00* (2013.01); *B32B 2419/04* (2013.01); *B32B 2607/00* (2013.01); *E04F 2201/07* (2013.01); *E04F 2203/065* (2013.01); *E04F 2203/08* (2013.01); *Y10T 156/10* (2015.01); *Y10T 156/1064* (2015.01); *Y10T 428/24802* (2015.01); *Y10T 428/24851* (2015.01); *Y10T 428/24917* (2015.01)

(56) References Cited

U.S. PATENT DOCUMENTS

| | | |
|---|---|---|
| 7,070,667 B1 | 7/2006 | Kirby |
| 7,155,871 B1 | 1/2007 | Stone et al. |
| 8,258,196 B2 | 9/2012 | Shimizu et al. |
| 8,298,654 B2 | 10/2012 | Kim et al. |
| 2004/0050015 A1 | 3/2004 | Foster |
| 2006/0188757 A1* | 8/2006 | Magnusson .......... B41M 7/0027 428/13 |
| 2011/0146183 A1 | 6/2011 | Wilkens et al. |
| 2011/0296780 A1 | 12/2011 | Windmoller |
| 2013/0067842 A1* | 3/2013 | Meersseman .......... B32B 7/12 52/309.4 |
| 2013/0086862 A1 | 4/2013 | Song et al. |

FOREIGN PATENT DOCUMENTS

| | | |
|---|---|---|
| EP | WO2009138241 A1 | 11/2009 |
| EP | WO2013026559 A2 | 2/2013 |
| JP | WO0196434 A1 | 12/2001 |
| JP | 2004075700 A | 3/2004 |
| WO | WO02060702 A2 | 8/2002 |

* cited by examiner

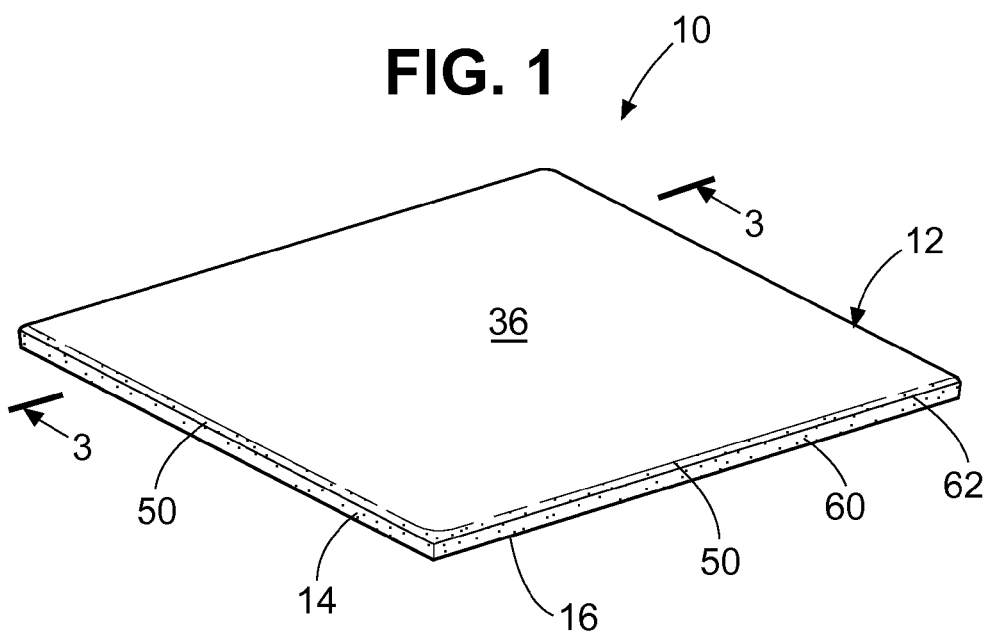
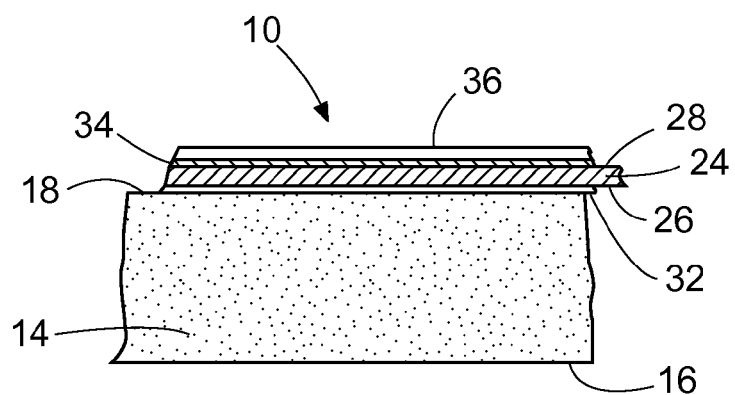

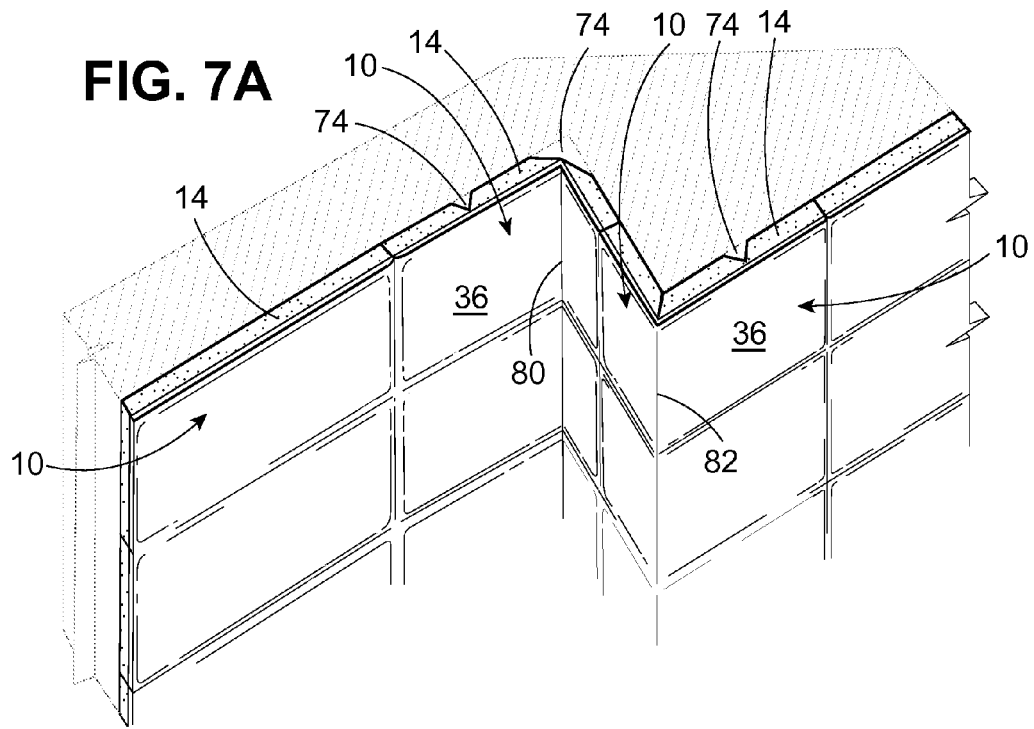
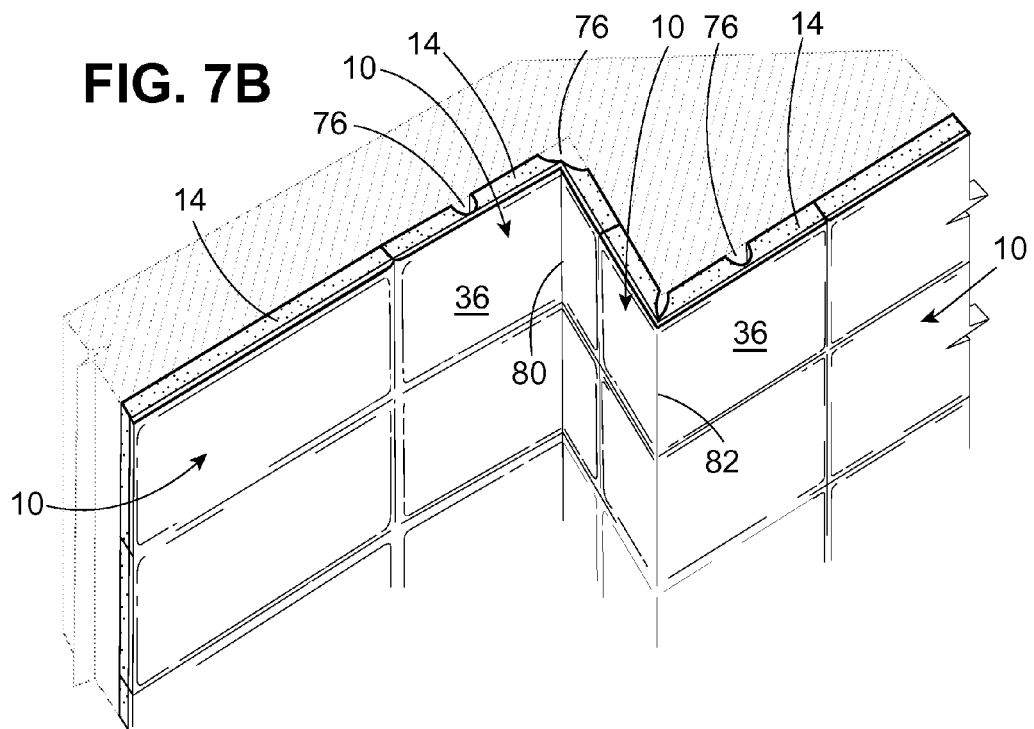

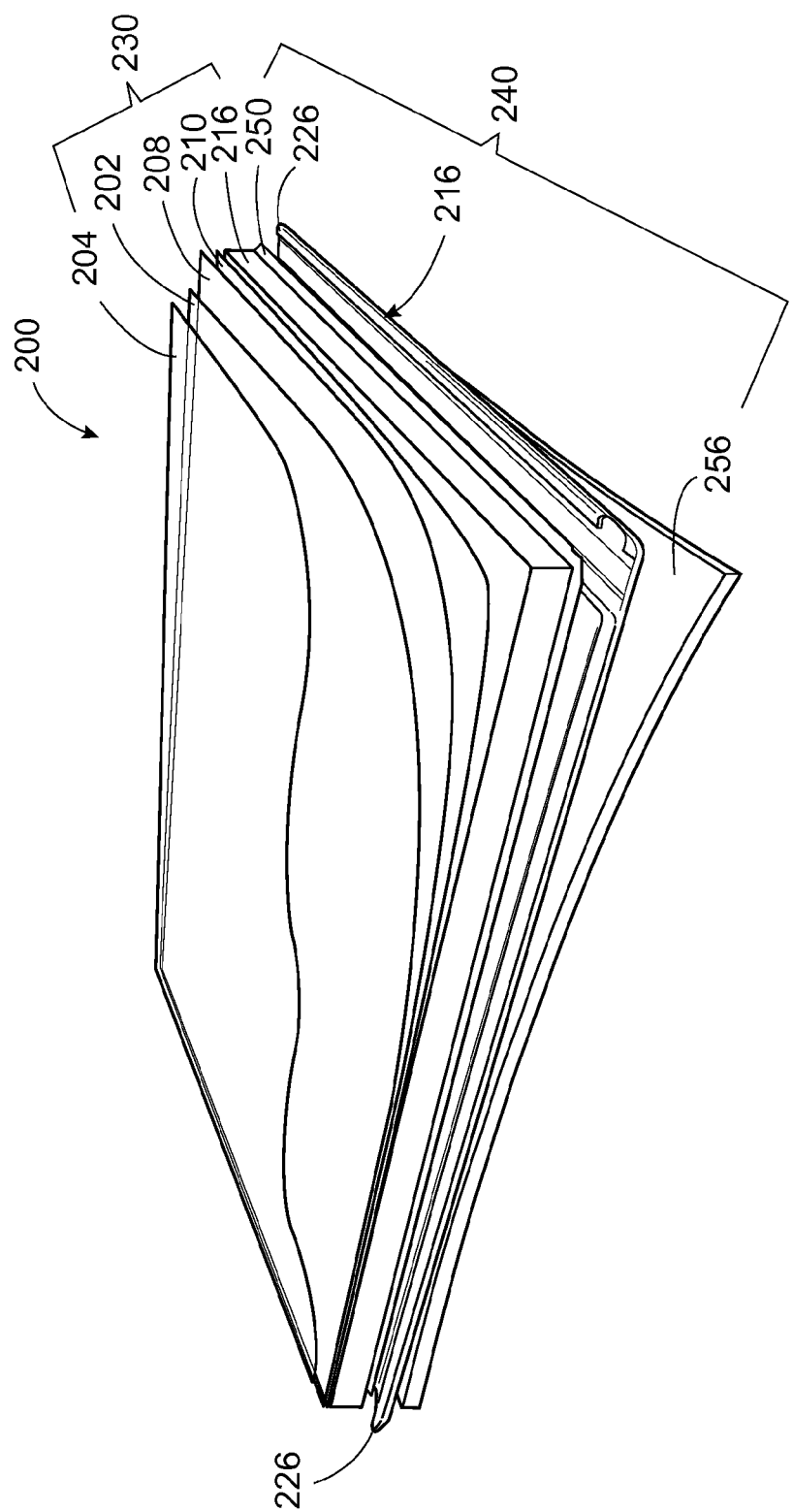

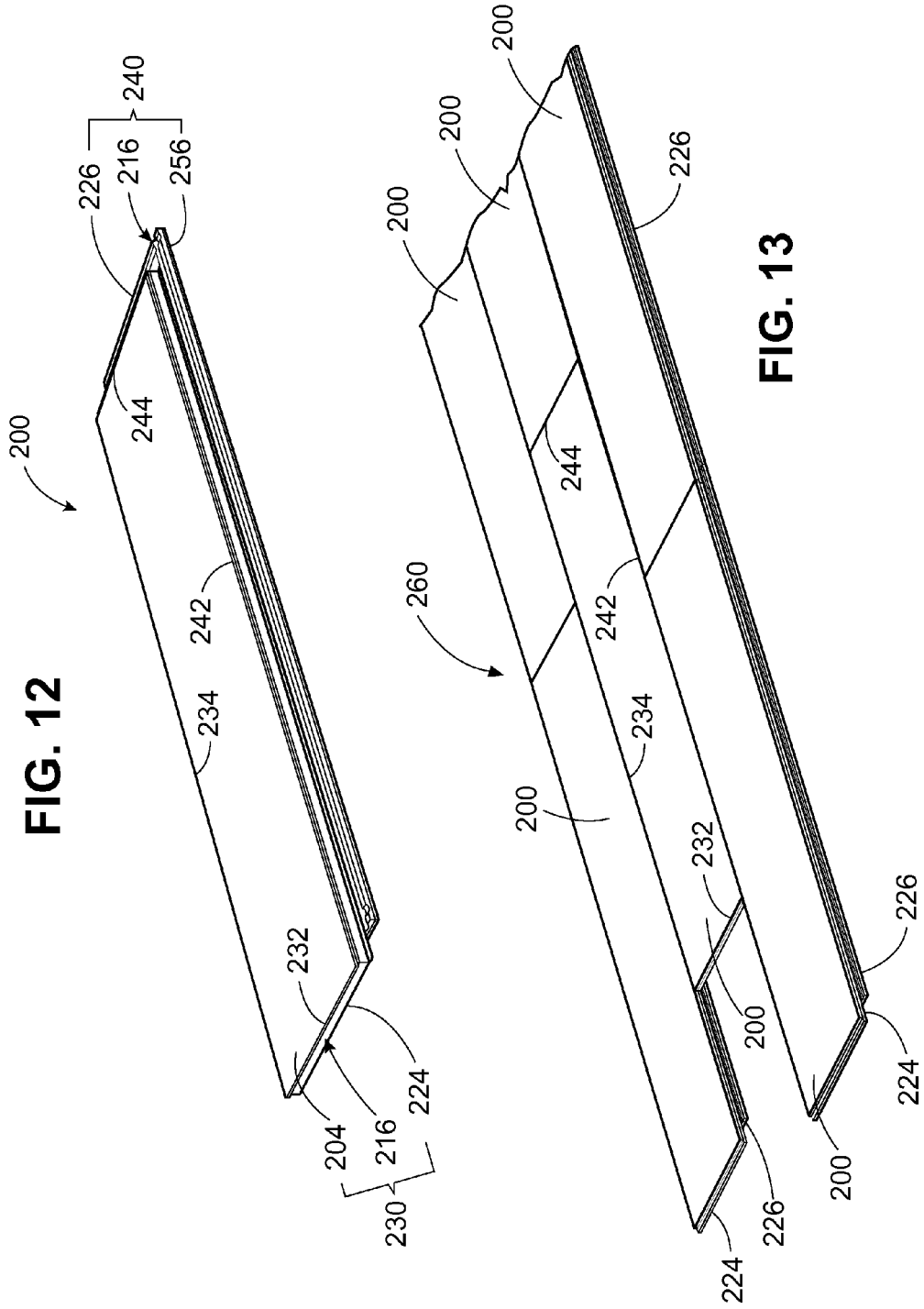

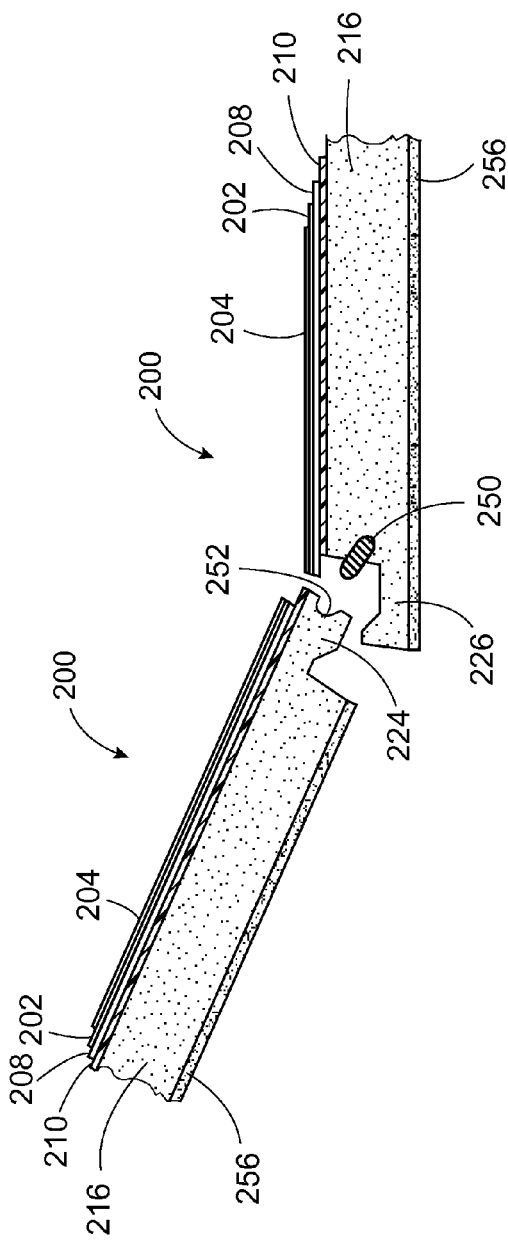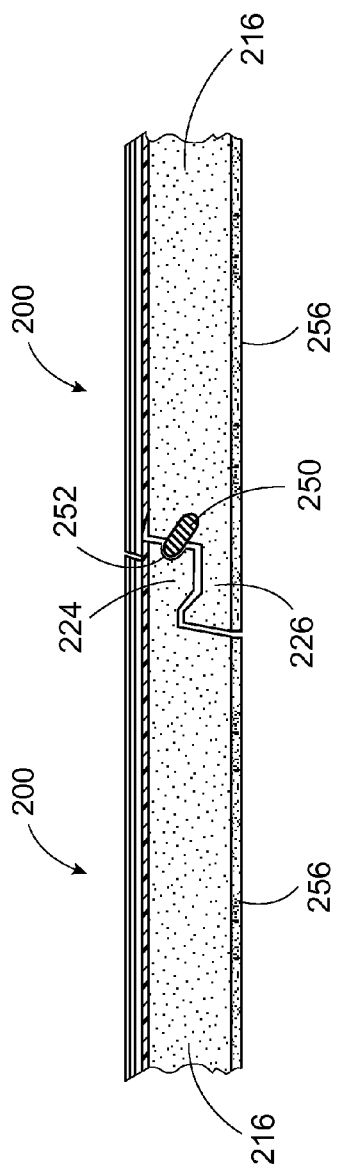

1

FLOOR PLANK WITH FOAM CORE

CROSS-REFERENCE TO RELATED APPLICATIONS

This application is a continuation-in-part of Ser. No. 14/260,958, filed Apr. 24, 2014.

BACKGROUND OF THE INVENTION

Field of the Invention

This invention is directed to a novel, laminated, lightweight, multi-purpose, composite flexible plastic tile that can be used as a ceiling tile, a wall tile and a floor tile. The tile can be directly bonded to a ceiling, wall or floor surface.

The tile can also be used as a ceiling tile in a suspended or hung ceiling assembly having grid sections that support the tile.

When used as a wall covering, the tile can be folded to continuously fit within an inside corner of intersecting walls or wrap around an outside corner.

When used as a floor covering, the tile can be installed with other similar tiles in a floating floor assembly, wherein the tiles are not bonded directly to a floor base. Examples of a floating floor assembly are shown in U.S. Pat. Nos. 7,155,871 and 7,458,191 which are incorporated by reference herein.

The multi-purpose tile is relatively inexpensive to manufacture and does not require special skills or training to handle and install, making it attractive for do-it-yourself individuals who have had no previous experience installing tiles.

The invention is also directed to methods for preparing the tile, and a method of covering a floor surface, wall surface or ceiling surface.

The invention is further directed to a floor member with a foam core, and a method of preparing a floor member for a floating floor installation.

DESCRIPTION OF THE DRAWINGS

In the accompanying drawings,

FIG. 1 is a simplified perspective view of a tile incorporating one embodiment of the present invention;

FIG. 2 is an enlarged fragmentary sectional view thereof showing the laminate details of the tile;

FIGS. 7A and 7B are simplified perspective views showing grooved tiles positioned at inside and outside corners of intersecting support surfaces;

FIG. 11 is a partially exploded enlarged fragmentary view of a floor member incorporating another embodiment of the invention;

FIG. 12 is a simplified perspective view thereof;

FIG. 13 is a simplified perspective view of an assembly pattern of the floor member of FIG. 12;

FIG. 14 is an enlarged fragmentary sectional view of joining means for joining the periphery of the floor member of FIG. 12 to adjacent members in a floating floor installation;

FIG. 15 shows the structure of FIG. 14 joined together; and,

Corresponding reference numbers indicate corresponding parts throughout the several views of the drawings.

DETAILED DESCRIPTION OF THE INVENTION

Figure 2A:
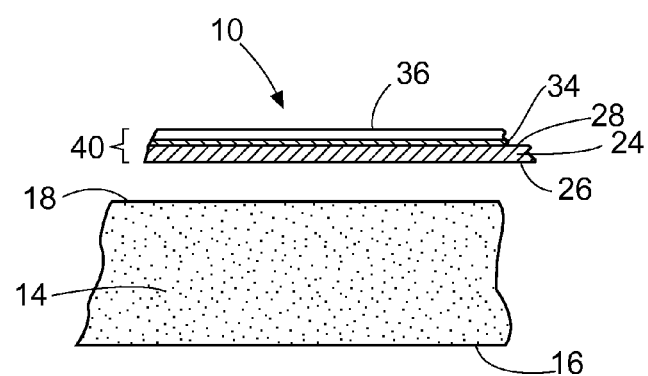
FIG. 2a is a view similar to FIG. 2 showing a laminate subassembly of the tile and a foam base layer thereof before they are joined together.

Referring to the drawings, a tile incorporating one embodiment of the invention is generally indicated by the reference number 10 in FIG. 1.

The tile 10 has a polygonal shape, such as a rectangle and is preferably in the form of a square having a peripheral edge 12. However the features and principles of the invention are adaptable to tiles of other shapes such as elongated rectangles and other geometrical shapes.

The tile 10 includes a base layer 14 (FIGS. 1 and 2) formed of a poly-foam or foamed plastic material having a lower surface or bottom foam surface 16 and an upper surface 18 (FIG. 2). If the tile 10 is to be directly bonded to ceiling, wall or floor surface the lower surface 16 can be provided with a suitable known bonding layer (not shown) covered with a suitable known release paper (not shown). Alternatively, the lower surface 16 can be left dry, that is, without a bonding material, to permit optional use of a bonding material by an installer during installation of the tile 10. The lower surface 16 is preferably left dry when the tile 10 is used in a hung ceiling assembly or in a floating floor assembly.

An upper substrate layer 24 (FIG. 2), formed of a non-foam plastic or metallic material has a lower surface 26 and an upper surface 28. The upper substrate layer 24 is provided over the upper foam surface 18 (FIG. 2).

An adhesive 32, which can be a layer or coating, is provided between the upper surface 18 of the foam base layer 14 and the lower surface 26 of the substrate layer 24 to join the substrate layer 24 and the foam base layer 14 together (FIG. 2).

The tile 10 also includes a design pattern or a decorative appearance of any selected type on or at the upper surface 28 of the substrate layer 24. The design pattern can be a wood grain design, a mineral grain design that resembles marble, granite or any other natural stone grain, or a color pattern, color blend or single color to name just a few design possibilities. The decoration or design pattern can be printed onto or otherwise applied to the upper surface 28 of the substrate layer 24, but is preferably provided on a separate printing film or design layer 34 of any suitable known plastic material (FIG. 2).

The design layer 34 is covered by a transparent or semi-transparent abrasion resistant wear layer 36 (FIG. 2) of known material and fabrication through which the design layer 34 can be viewed. The top of the wear layer 36 is the top surface of the tile 10. The wear layer 36 protects the design pattern, especially when the tile 10 is used as a floor tile. However, if no design or decoration is provided on or at the substrate layer 24, then the wear layer 36 may be opaque.

The wear layer 36 has a slightly curved surface declination 50 (FIG. 3) at each side of the peripheral edge 12 (FIG. 1) of the tile 10. The surface declinations 50 extend the fill length of each side of the tile 10 at the peripheral edge 12.

Figure 3:
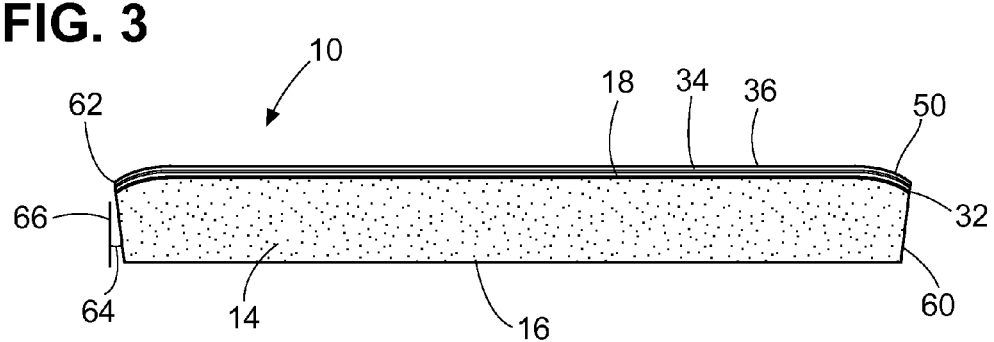
FIG. 3 is an enlarged sectional view thereof taken on the line 3-3 of FIG. 1 showing the approximate thickness ratios of the laminated components of the tile.

The peripheral edge 12 of the tile 10 can also include beveled edge portions 60 (FIG. 3) that diverge upwardly from the lower base surface 16 of the foam base layer 14. The beveled edge portions 60 intersect the curved surface declinations 50 at an intersection line 62 (FIG. 3) that is slightly below the top surface 36 of the tile 10. The beveled edge portions 60 have an angle of divergence 64 (FIG. 3) of approximately 5 to 35 degrees as measured, for example, from a vertical axis 66 (FIG. 3).

If the tile 10 is used as a floor tile, the wear layer 36 can be provided with suitable known relief or surface embossments (not shown) or any other known texturing to provide traction. Relief or surface embossments may also be desirable if the tile 10 is used as a wall or ceiling tile.

The distance between the bottom surface 16 and the upper surface 18 of the base layer 14 defines a first partial thickness of the tile member unit 10.

The distance between the top surface 36 of the tile member 10 and the upper foam surface 18 defines a second partial thickness of the tile member 10.

Thus as most clearly shown in FIG. 2 the overall thickness of the tile 10 is substantially the sum of the first partial thickness and second partial thickness of the tile 10.

Although the dimensions of the tile 10 are a matter of choice, a suitable size can be, for example, 12 inches by 12 inches. Smaller or larger size tiles are a matter of choice.

The overall thickness of the tile 10 can vary from about 2 to 17 mm and the thickness of the foam base layer 14 can be approximately 15 to 20 times thicker than the total thickness of the other constituent layers of the tile 10.

The tile 10 has relatively low density and light weight as compared to solid layer tiles, especially because the foam base layer 14 constitutes a substantial volume of the tile as shown in FIGS. 2 and 3. The tile 10 also has relatively good impact resistance, good thermal insulation, and good acoustical insulation. The low density and lightweight characteristics of the tile 10 facilitate handling and installation.

The tile 10 can be assembled with other similar tiles 10 in any selected assembly pattern on a ceiling, wall or floor.

When used as a wall covering the tile 10 can be provided with any suitable known self-adhesive material or provided with a dry bottom surface 16 and installed with a mastic or bonding material to bond the tile 10 directly to the wall surface.

The lightweight features of the tile 10 are advantageous for obtaining a secure bond when installing the tile 10 on vertical wall surfaces. It is also especially easy to install the tile 10 at vertical corners (FIGS. 7A and 7B), such as at inside corners of intersecting walls, and at outside corners, such as at entry ways. An inside or outside corner installation is accomplished by forming a groove in the foam base layer 14 of the tile 10 to facilitate bending or folding of the tile.

Figure 4:
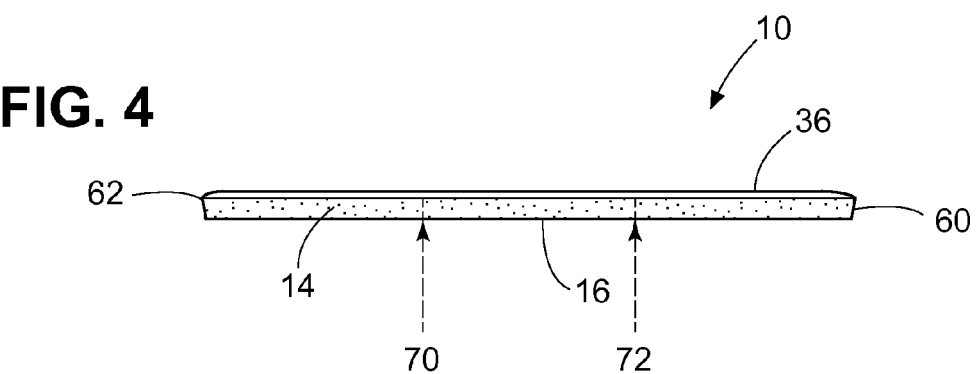
FIGS. 4-6 are simplified schematic sectional views showing V-shaped and curved grooving of the foam base of the tile to facilitate bending or folding of the tile at inside and outside corners of intersecting support surfaces.
Figure 5:
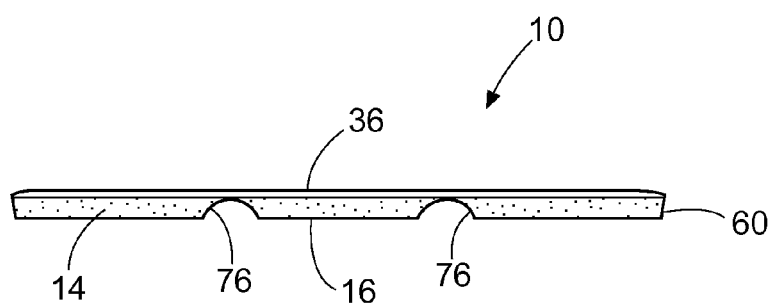
Figure 6:
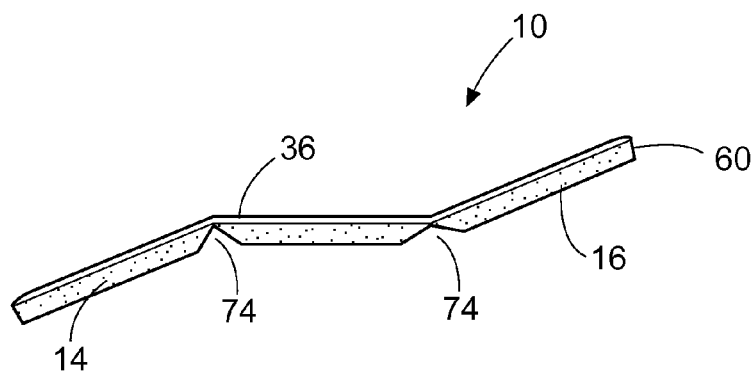

For example, referring to FIGS. 4-6 the lower base surface 16 of the foam base layer 14 can be scored or grooved at any selected locations such as 70 and 72 (FIG. 4). The depth of the scoring or grooving should not extend past the upper surface 18 (FIG. 2) of the foam base layer 14.

The grooving or scoring can be in the form of a V-shaped groove 74 (FIG. 6) or a semi-circular groove 76 (FIG. 5). Grooves of any other known shape that facilitate bending or folding of the tile 10 can also be used to enable the tile to conform in one continuous piece to any vertical intersecting surfaces that intersect at any intersection angle.

Since most interior vertical surfaces intersect at 90° angles the V-shaped groove 74 can be approximately 120° as shown in FIG. 6. The grooves 74 and 76 can be cut or formed with a router (not shown) or any other suitable known grooving tool wherein the grooves 74 and 76 are directed into the lower base surface 16 of the foam base layer 14.

Once the base surface 16 is grooved the tile 10 can be folded or bent at the groove to conform to an inside corner 80 or an outside corner 82 as shown in FIGS. 7A and 7B.

The tile 10 can also be bonded directly to a ceiling surface (not shown) in a manner similar to that described for installing the tile on a wall surface. If the tile 10 is to be continuously installed on a ceiling and wall surface the tile can be grooved and folded, as previously described, to enable the tile to conform to the intersection of the wall and ceiling surfaces.

When used in a hung ceiling installation (not shown) the tile 10 can be easily positioned in and removed from a suspended ceiling grid support frame (not shown). If desired, a suitable known low tack adhesive can be applied in one or more small spots on the wear layer 36 of the tile 10 near the peripheral edge 12 to lightly adhere the tile 10 to the ceiling grid (not shown) of the hung ceiling, yet still permit clean and easy removal of the tile 10 from the grid support.

Foam plastic materials suitable for forming the foam base layer 14 include polyurethane, polyamide copolymers, polystyrene, polyvinyl chloride (PVC), polypropylene and polyethylene foamed plastics, all of which have good molding processability.

Polyvinyl chloride (PVC) foam materials are especially suitable for forming the foam base layer 14 because they are chemically stable, corrosion resistant, and have excellent flame-retardant properties.

It is well known that foam plastic material contains hollow globules or air cells, which can be closed cells, that provide the foam plastic material with reduced density and lighter weight in comparison with dimensionally similar non-foam plastic material.

It is also well known in the art that the preparation of a composite laminated plastic tile that includes plural layers usually requires relatively high compression forces and relatively high temperatures to provide a secure surface to surface bond between the layers of the laminate tile.

Applicant has found that the elevated pressures and temperatures that are usually associated with preparing a composite laminated plastic tile with solid layers are generally not feasible for laminating the presently disclosed composite plastic tile having a foam layer. The elevated pressures and temperatures generally used for laminating solid plastic layer tile can burst or unduly compress the air cells in a foam layer and thereby substantially increase the density of the foam layer 14, compared to the density of the foam layer 14 in its non-compressed condition.

It is thus of significant importance in making the light weight, laminated, multi-purpose tile 10, to avoid a substantial increase in density of the foam base layer 14 when the component layers of the tile 10 as shown in FIG. 2 are placed under pressure to produce the laminated composite tile 10. It is also of significant importance to establish a pressure or pressure range for laminating the component layers of the tile 10 that provides a good surface to surface bond between the layers without unduly increasing the density of the foam base layer 14, compared to the density of the foam layer 14 in its non-compressed condition.

Another problem dealt with by applicant in making the tile 10 as a light weight, foam based structure is preserving the dimensional integrity of the tile 10, maintaining the stability and shape of the tile 10, and preventing warpage of the tile 10.

In making the tile 10 the foam base layer 14 is preferably formed of PVC. The thickness of the foam base layer 14 can vary from about 1 to 15 mm, preferably from about 1.5 to 12 mm, more preferably from about 2 to 10 mm, even more preferably from about 2 to 8 mm, and most preferably from about 2 to 6 mm.

The components of the foam base layer 14 are well known in the art and typically comprise, in weight %:

| | |
|---|---|
| Plastic material | 40 to 90% |
| Foaming agent | 0.7 to 3% |
| Foam control agent | 4 to 8% |
| Stabilizing agent | 1.5 to 5% |
| Plasticizing agent | 0 to 15% |
| Lubrication agent | 1 to 2% |
| Heavy calcium | 0 to 50% |
| Toughening agent | 3 to 9% |
| Flame-retardant agent | 3 to 15% |
| Antiseptic and anti-mildew agent | 0.5 to 2% |

The density of the foam base layer 14 can vary from about 0.1 to 1.5 grams/cc, preferably from about 0.2 to 1.4 grams/cc, more preferably from about 0.3 to 1.3 grams/cc, even more preferably from about 0.4 to 1.2 grams/cc, even more preferably from about 0.5 to 1.2 grams/cc, and most preferably from about 0.6 to 1.2 grams/cc.

The upper substrate layer 24 can comprise metal, alloy or macromolecular materials, and preferably comprises macromolecular materials, for example, addition polymers such as vinyl monomer copolymers or homo-polymers; condensation polymers such as polyesters, polyamides, polyimides, epoxy resins, phenol-formaldehyde resins, urea-formaldehyde resins; natural macromolecular materials or modified derivatives thereof, such as plant fibers, animal fibers, and the like, or mineral fibers such as asbestos, ceramic fibers, carbon fibers, and the like.

The upper substrate layer 24 preferably comprises addition polymers and more preferably comprises vinyl monomer copolymers and/or homo-polymers such as polyethylene, polyvinyl chloride (PVC), polystyrene, polymethacrylates, polyacrylates, polyacrylamides, ABS (acrylonitrile-butadiene-styrene) copolymers, polypropylene, ethylene-propylene copolymers, polyvinylidene chloride, polytetrafluoroethylene, polyvinylidene fluoride, hexafluoropropene, styrene-maleic anhydride copolymers, and the like.

The upper substrate layer 24 most preferably comprises polyethylene or polyvinyl chloride (PVC). The polyethylene can be low density polyethylene, medium density polyethylene, high density polyethylene or ultra high density polyethylene.

The upper substrate layer 24 can also include filler materials and other additives that improve the physical properties and/or chemical properties and/or the processability of the product. These additives include known toughening agents, plasticizing agents, reinforcing agents, antimildew (antiseptic) agents, flame-retardant agents, and the like.

The thickness of the upper substrate layer 24 can vary from about 0.1 to 2 mm, preferably from about 0.15 to 1.8 mm, more preferably from about 0.2 to 1.5 mm, and most preferably from about 0.3 to 1.5 mm.

The thickness ratio of the foam base layer 14 to the upper substrate layer 24 can vary from about 1 to 15:0.1 to 2, preferably from about 1.5 to 10:0.1 to 1.5, more preferably from about 1.5 to 8:0.2 to 1.5, and most preferably from about 2 to 8:0.3 to 1.5, respectively.

The adhesive layer 32 can be any well-known bonding agent or binder capable of bonding together the upper substrate layer 24 and the foam base layer 14, for example polyurethanes, epoxy resins, polyacrylates, ethylene-vinyl acetate copolymers, ethylene-acrylic acid copolymers, and the like. Preferably, the adhesive layer 32 is a hot-melt bonding agent.

The design layer 34 can comprise any suitable known plastic material such as a known formulation of PVC resin, stabilizer, plasticizer and other additives that are well known in the art. The design layer can be formed with or printed with printed patterns, such as wood grains, metal or stone design and fibrous patterns or three-dimensional figures. Thus the design layer 34 can provide the tile 10 with a three dimensional appearance that resembles heavier products such as granite, stone or metal.

The thickness of the design layer can vary from about 0.01 to 0.1 mm, preferably from about 0.015 to 0.08 mm, more preferably from about 0.2 to 0.7 mm, and most preferably from about 0.02 to 0.5 mm.

The wear layer 36 that forms the upper surface of the tile 10 can comprise any suitable known abrasion-resistant material, such as an abrasion-resistant macromolecular material coated onto the layer beneath it, or a known ceramic bead coating. If the wear layer 36 is furnished in layer form, it can be bonded to the layer beneath it.

The wear layer 36 can also comprise an organic polymer layer and/or inorganic material layer, such as an ultraviolet coating or a combination of another organic polymer layer and an ultraviolet coating. For example, an ultraviolet paint capable of improving the surface scratch resistance, glossiness, antimicrobial resistance and other properties of the product. Other organic polymers including polyvinyl chloride resins or other polymers such as vinyl resins, and a suitable amount of plasticizing agent and other processing additives can be included, as needed.

The method for producing the light weight foamed plastic composite tile 10 includes:
  (a) preparing a foam base layer;
  (b) preparing a substrate layer;
  (c) applying adhesive on a surface of the substrate layer and/or the foam base layer;
  (d) contacting the substrate layer and the foam base layer so that the substrate layer and foam base layer are bonded together by the adhesive; and
  (e) applying pressure to the substrate layer and the foam base layer at a pressure and temperature sufficient to produce a laminated light weight foam plastic composite tile including the foam layer, wherein each of the layers of the light weight foam plastic composite tile have substantially the same thickness and density after being pressed together as they did before being pressed together.

The substrate layer 24 can be bonded to the foam base layer 14 by coating the upper surface 18 of the foam base layer 14 and/or the lower surface 26 of the substrate layer 24 with the adhesive bonding agent 32 and contacting the mating surfaces 18 and 26.

A known balance layer (not shown) can be disposed between the foam base layer 14 and the substrate layer 24. The balance layer helps provide dimensional stability to the tile 10 by minimizing the effect of coefficients of expansion of different materials that are laminated above and below the balance layer. The balance layer thus helps inhibit curving, cupping or arching of the tile 10, and also helps to ensure the dimensional stability of the tile 10.

A known balance layer (not shown) can also be included between the wear layer 36 and the upper substrate layer 24 for purposes previously described.

The bonding of the upper substrate layer 24 to the foam base layer 14 is accomplished under pressure. Other methods to bond the foam base layer 14 to the substrate layer 24 can be employed, such as a known one-step formation using an adhesive thermal bonding machine known in the art that employs pressure after adhesive application.

The substrate layer 24, the design layer 34, and the wear layer 36 can be initially laminated together to form an upper substrate laminate subassembly 40 as shown schematically in FIG. 2a. The laminate subassembly 40 and the foam base layer 14 can then be laminated together to form the tile 10 (FIG. 2).

Alternatively, the wear layer 36, the design layer 34 the substrate layer 24 and the foam base layer 14 can be laminated together simultaneously to form the tile 10.

Figure 8:
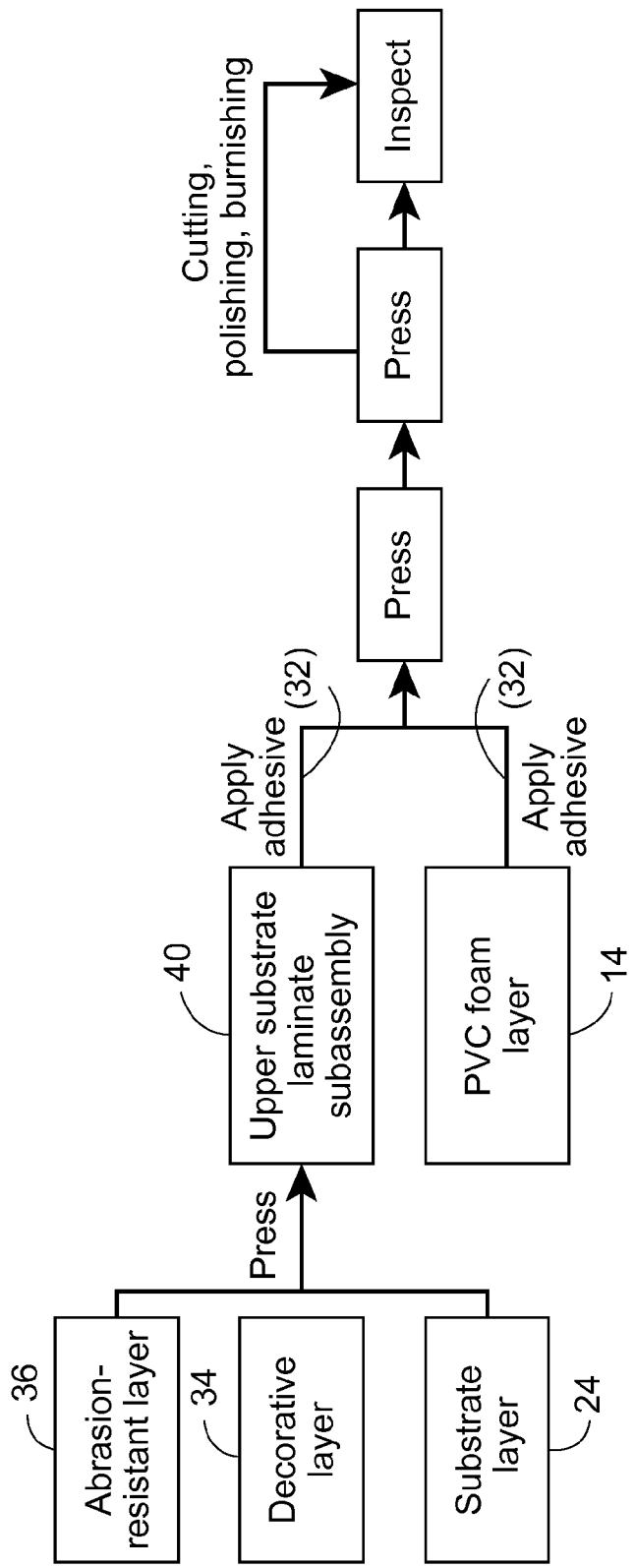
FIG. 8 is a simplified schematic diagram of the manufacturing steps for making one embodiment of the tile incorporating a PVC foam base layer.

The pressing process can be either cold or ambient temperature pressing or thermal pressing at an elevated temperature. Thermal pressing is preferred for joining together the constituent components of the tile 10, and most preferably includes a heating stage and a cooling stage as schematically indicated in FIG. 8.

The pressure applied during the heating stage can vary from about 10 to 150 kg/cm$^2$, preferably from about 10 to 80 kg/cm$^2$, more preferably from about 15 to 80 kg/cm$^2$, and most preferably from about 15 to 60 kg/cm$^2$.

The pressure applied during the cooling stage can vary from about 10 to 150 kg/cm$^2$, preferably from about 10 to 80 kg/cm$^2$, more preferably from about 15 to 80 kg/cm$^2$, and most preferably from about 15 to 60 kg/cm$^2$.

The duration of the pressing process is about 15 to 100 minutes, preferably about 20 to 90 minutes, more preferably about 25 to 80 minutes, and most preferably about 30 to 70 minutes.

The pressures applied during the heating stage and the cooling stage can be the same or different, and are preferably the same.

The temperature during the heating stage can vary from about 40 to 150° C., preferably from about 50 to 130° C., more preferably from about 60 to 100° C. and most preferably from about 75 to 100° C.

The temperature during the cooling stage can vary from about 15 to 30° C., preferably from about 18 to 26° C. and most preferably from about 20 to 25° C.

The duration of pressing during the heating stage can vary from about 5 to 50 minutes, preferably from about 10 to 45 minutes and more preferably from about 15 to 40 minutes. The duration of pressing during the cooling stage can vary from about 5 to 50 minutes, preferably from about 10 to 45 minutes, and more preferably from about 15 to 40 minutes. The duration of pressing during the heating stage and the cooling stage can be the same or different, and are preferably the same.

After formation of the tile 10 one or more post-treatment finishing steps can also be included, such as cutting, polishing, burnishing, inspecting and packaging of the tile 10.

In one illustrative embodiment of the invention the tile 10 includes the foam base layer 14 being formed of PVC of the type previously described, having a thickness of 4 mm. The substrate layer 24 is a PVC layer having a thickness of 1 mm, the design layer 34 has a thickness of 0.3 mm, and the abrasion resistant layer 36 has a thickness of 0.2 mm. The total thickness of the upper substrate laminate 40 is thus 1.5 mm.

The tile 10 with the PVC foam base layer 14 is formed under pressure during a heating and cooling stage as follows.

A pressure of 35 kg/cm$^2$ is applied to the PVC foam base layer 14 in contact with the upper substrate layer 24 at a temperature of about 80° C. for 25 minutes. The pressure is maintained for an additional 25 minutes during the cooling stage to ambient temperate.

After pressurization, the thickness of the upper substrate laminate 40 is about 1.5 mm. The thickness of the PVC foam base layer 14 is 3.95 mm. The density of the PVC foam base layer 14 before and after pressurization basically remains unchanged at 1.0 g/cc.

Thus the base layer of foam 14 is bonded to the upper substrate layer 24, and the base layer of foam 14 is placed under pressure while being bonded to the upper substrate layer 24, and the density and thickness of the base layer of foam 14 after being bonded to the upper substrate layer 24 is substantially the same density and thickness as before being placed under pressure.

After the formation of the tile 10 is completed, and if desired, a suitable known adhesive can be applied to the lower base surface 16 of the PVC foam base layer 14, to facilitate affixation of the tile 10 to a wall or ceiling.

In a second illustrative embodiment of the invention the tile 10 includes the substrate layer 24 being formed of polyethylene (PE) having a thickness of 1 mm. The upper substrate laminate 40 has a total thickness of 1.5 mm.

The PVC foam base layer 14 has a thickness of 4 mm.

The adhesive 32 is of a suitable known formulation and is contacted to the upper surface 18 of the foam base layer 14, and to the lower surface 26 of the upper substrate layer 24. The adhesive coated surface 18 of the foam base layer 14 and the adhesive coated surface 26 of the upper substrate layer 24 are then superimposed and pressed together at a pressure of 80 kg/cm$^2$ while heating to a temperature of 80° C. for 25 minutes. Pressurization is then continued after the heating stage for an additional 40 minutes during the cooling stage to ambient temperature.

After pressurization, the thickness of the upper substrate laminate 40 remains at 1.5 mm and the thickness of the PVC foam base layer 14 is 3.93 mm. The density of the PVC foam base layer 14 before and after pressurization basically remains unchanged at 1.2 grams/cc.

In a third illustrative embodiment of the invention the tile 10 includes the substrate layer 24 being formed of polyethylene (PE) and the upper substrate laminate 40 having a total thickness of 0.7 mm. The foam base layer 14 is formed of PVC foam having a thickness of 4 mm.

The adhesive 32 is of a suitable known formulation and is contacted or coated onto the upper surface 18 of the PVC foam base layer 14, and to the lower surface 26 of the substrate layer 24. The adhesive surfaces are superimposed and pressed together at a pressure of 20 kg/cm$^2$ and a temperature of 60° C. for 40 minutes. The application of pressure is continued after the heating stage for 20 minutes during the cooling stage to ambient temperature.

After pressurization, the thickness of the upper substrate laminate 40 is 0.7 mm and the thickness of the PVC foam base layer 14 is 3.93 mm. The density of the PVC foam material of the layer 14 before and after pressurization basically remains unchanged at 0.6 g/cc.

Figure 9:
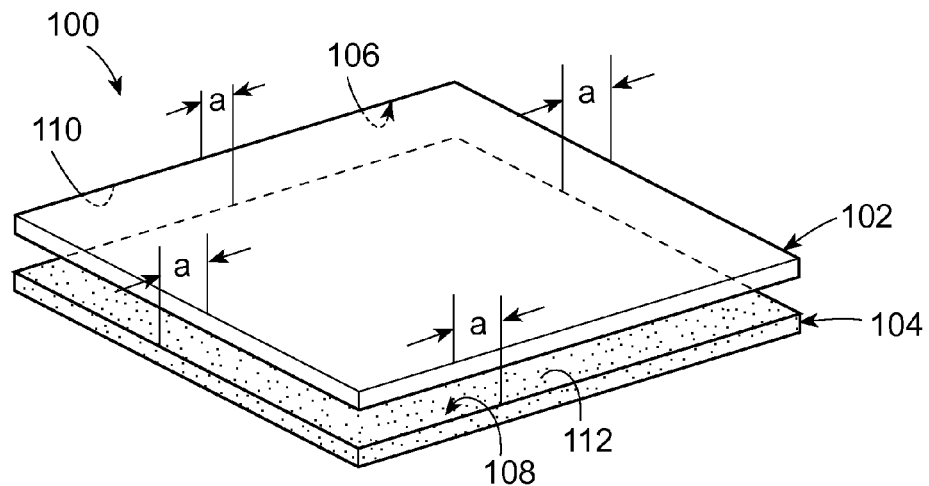
FIG. 9 is a perspective view of a floor tile incorporating another embodiment of the invention.

In a fourth illustrative embodiment of the invention a floor tile for a floating floor assembly is generally indicated by the reference number 100 in FIG. 9. The features and principles of the floor tile 100 are also adaptable to floor planks.

The floor tile 100 includes a first floor member portion 102 and a second floor member portion or underlayer portion 104 that are of identical size and shape. The first floor member portion 102 is laminated to the second floor member portion 104 such that the first floor member portion 102 has a predetermined offset from the second floor member portion 104 in the manner described in U.S. Pat. Nos. 7,155,871, 7,322,159, and 7,458,191, the disclosures of which are hereby incorporated by reference in this application.

The layer structure of the first floor member portion 102 includes a base layer, a substrate layer, and adhesive layer, a design layer and an abrasion resistant layer, all of which are structurally similar to the corresponding layers 14, 24, 32, 34 and 36 of the tile 10 as shown in FIG. 2.

The second floor member portion 104 is a foam layer that is structurally similar to the base layer 14 of the tile 10 as shown in FIG. 2.

The first floor member portion 102 is preferably formed as a complete and separate laminate unit before being laminated to the second floor member portion 104.

Preferably, but not necessarily, the second floor member portion 104 has no surface declinations or beveled edges.

The first floor member portion 102 extends an offset amount "a" beyond the second floor member portion 104 to define an offset L-shaped marginal section 106 (FIG. 9) of the first floor member portion 102.

Also, in the offset arrangement of the first and second floor member portions 102 and 104, the second floor member portion 104 extends the offset amount "a" beyond the first floor member portion 102 to define an offset L-shaped marginal section 108 (FIG. 9) of the second floor member portion 104.

The L-shaped marginal section 106 of the first floor member portion 102 and the L-shaped marginal section 108 of the second floor member portion 104 are of identical size and shape.

A suitable known bonding material for laminating the first and second floor member portions 102 and 104 together can be provided on either a lower surface 110 of the first floor member portion 102 or an upper surface 112 of the second floor member portion 104. Under this arrangement only one of the L-shaped marginal sections 106 or 108 is provided with adhesive.

However, the bonding material for the laminated first and second floor member portions 102 and 104 is preferably provided on the lower surface 110 of the first floor member portion 102 and on the upper surface 112 of the second floor member portion 104.

The L-shaped marginal section 106 thus has an exposed downwardly directed adhesive surface that is part of the lower surface 110 of the first floor member portion 102, and the L-shaped marginal section 108 has an exposed upwardly directed adhesive surface that is part of the upper surface 112 of the second floor member portion 104. The adhesive on the exposed adhesive surfaces on the L-shaped marginal sections 106 and 108 is the bonding material used for laminating the first floor member portion 102 and the second floor member portion 104 together.

Although the dimensions of the floor tile 100 are a matter of choice, a suitable size for the first floor member portion 102 and the second floor member portion 104 can be, for example, 12 inches by 12 inches. Smaller or larger size floor tiles are a matter of choice. The thickness of the first floor member portion 102 can vary from about 2 to 5 mm and the thickness of the second floor member portion 120 can vary from about 2 to 5 mm. The marginal offset "a" can be, for example, approximately 1 inch. The amount of offset "a" is a matter of choice, and larger or smaller offsets are also usable.

The foam structure of second floor member portion 104 of the floor tile 100 is yieldable to small bumps and other imperfections generally referred to as surface irregularities in a floor base. The second floor member portion 104 thus enables the floor tile 100 to conform to such surface irregularities and lie flat on a floor base.

Figure 10:
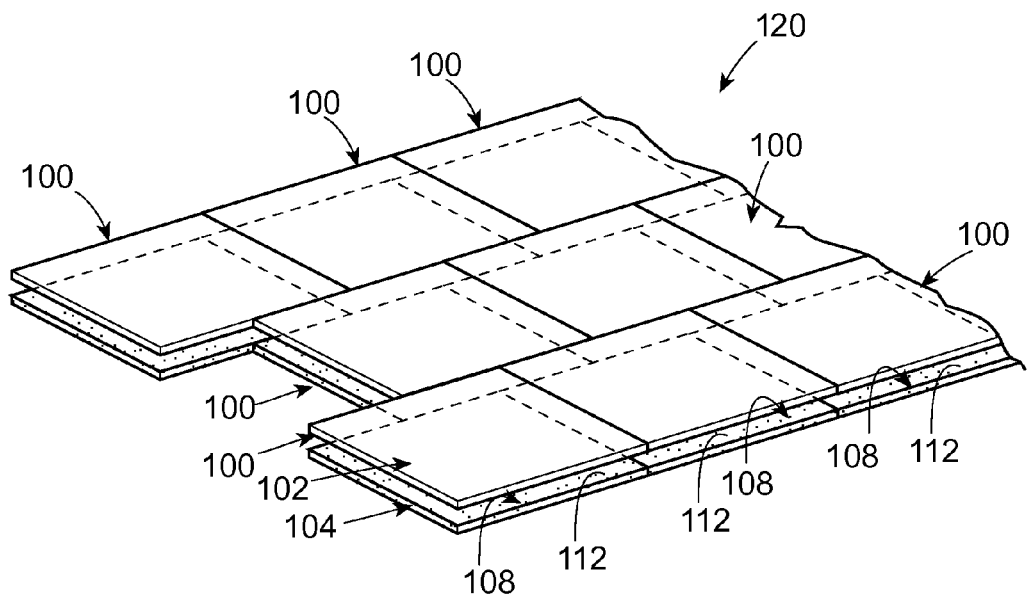
FIG. 10 is a perspective view of an assembly pattern thereof.

During installation of the floor tiles 100 in side-by-side and end-to-end relationship the downwardly directed L-shaped marginal section 106 of the first floor member portion 102 is positioned to engage the upwardly directed L-shaped marginal section 108 of the second floor member portion 104 in the manner shown in the tile assembly 120 of FIG. 10. The tile assembly 120 is but one example of known tile assembly patterns that are a matter of choice.

The tile 10 can be installed on a floor base without any mastic or adhesive coating on the floor base, and without mastic or adhesive on an undersurface 114 (FIG. 9) of the second floor member portion 104. Thus, during installation, the floor tiles 100 can be placed on a dry floor base surface for easy shifting to any selected position thereby facilitating installation of the floor tiles 100 in any selected pattern or arrangement.

A fifth illustrative embodiment of the invention is a flexible, laminated floor member unit generally indicated by the reference number 200 in FIG. 12. The term "floor member" as used hereinafter is intended to refer to a floor plank, but the concepts and structures described herein are also applicable to floor tiles.

The floor member is installable on a floor base with a plurality of other similar floor members without being bonded directly to the floor base as part of a "floating floor" installation.

The constituent layers and components of the floor member 200 are shown in FIG. 11 in partially exploded, enlarged fragmentary form. The floor member 200 has a polygonal shape, and is preferably in the form of an elongated rectangle.

Although the size of the floor member 200 is a matter of choice, outside dimensions of approximately 8 inches by 4 feet have been found to be an attractive size and render the floor member 200 relatively easy to handle and install.

Referring to FIG. 12, the floor member 200 has an upper portion 230 offset from a lower portion 240. The upper portion 230 of the floor member 200 includes a clear vinyl wear layer 202 (FIGS. 11 and 14) of known construction. The clear vinyl wear layer 202 can be approximately 0.5 to 0.9 mm thick, and is preferably 0.7 mm thick. The clear vinyl wear layer provides the floor member 200 with protection against scuffs and abrasions.

The upper portion 230 of the floor member 200 also includes a coating or overlayer 204 (FIGS. 11 and 14) with a known mixture of ceramic beads and urethane that overlies the wear layer 202. The coating 204 includes microscopic ceramic particles (not shown) suspended in an ultra-violet cured urethane coating. The coating 204 provides the floor member 200 with enhanced wear and stain resistance and also enables the floor member 200 to be easily maintained.

The upper portion 230 of the floor member 200 also includes a known decorative film or layer 208 (FIGS. 11 and 14) located beneath the clear vinyl wear layer 202. The decorative film 208 incorporates a high-resolution design such as a wood-grain design, although the design or décor of the decorative film 208 is a matter of choice.

The design or decorative appearance of the floor member 200 is essentially the design or appearance of the decorative film 208, since the clear vinyl wear layer 202 and the ceramic bead layer 204 are substantially transparent.

The upper portion 230 of the floor member 200 further includes a solid vinyl layer 210 (FIGS. 11 and 14) of known construction underneath the decorative film 208. The solid vinyl layer 210 can be approximately 2.5 to 3.5 mm thick, and is preferably about 3.0 mm thick. The solid vinyl layer 210, which can be formed of multiple layers of solid virgin vinyl, helps resist denting and chipping of the floor member 200 and enhances the durability as well as the dimensional stability of the floor member 200. The solid vinyl layer 210 also facilitates any desired embossing of the overlying layers 202, 204 and 208. Such embossing embellishes the natural appearance of the floor member and also provides the surface of the floor member 200 with improved traction.

The floor member 200 further includes a core layer 216 (FIG. 14) of closed-cell polyvinyl chloride (PVC) foam provided below the vinyl layer 210. The core layer 216 is similar in its makeup to the closed-cell foam base layer 14 (FIGS. 1-4) of the multi-purpose tile 10, with a density that can vary from about 0.1 to 1.5 grams/cc. However, the core layer 216 has a thickness of approximately 4.8 to 6.0 mm, and is preferably about 5.0 mm thick.

A first known floor member edge joining means 224 (FIGS. 12 and 14) is provided in the core layer 216 at the upper offset portion 230 of the floor member 200, at two intersecting edges 232, 234 (FIG. 12) of the floor member 200. A second known complementary edge joining means 226 (FIGS. 12 and 14) is provided in the core layer 216 at the lower offset portion 240 of the floor member 200, at the other two intersecting edges 242, 244 (FIG. 12) of the floor member 200.

The edge joining means 224 and 226 (FIG. 14) are known locking systems identified by the trademarks ALLURE CLIC and UNICLIC of Halstead New England Corporation, Norwalk, Conn.

The edge joining means 224 of one floor member 200 is connectable at one edge to the complementary edge joining means 226 of a first adjacent floor member 200, to form a non-adhesive, mechanical locking connection between two adjacent floor members 200, 200.

A known supplementary locking system identified as the 5G Locking System of Valinge Innovation AB, Viken, Sweden includes a stub-like flexible plastic projection 250 (FIGS. 11 and 14) provided in the core layer 216 at the second connection means 226 (FIG. 14) for engagement with a recess 252 (FIG. 14) provided in the core layer 216 at the first connection means 224. The plastic projection 250 and the recess 252 can extend along one or more edges of the floor member 200.

The floor member 200 further includes a resilient, shock absorbing bottom underlayment 256 (FIGS. 11 and 14), bonded to the lower surface of the core layer 216, in the lower portion 240 (FIG. 12) of the floor member 200. The underlayment 256 of the floor member 200 is made of a cross-linked polyolefin foam, preferably an irradiated, cross-linked polyolefin foam known in the art as "IXPE". Preferably, the cross-linked polyolefin foam is polyethylene, and, more preferably low density polyethylene (LDPE). The IXPE is compounded with the following materials to optimize its cushioning qualities.

TABLE 1

| Item | Weight % |
|---|---|
| LDPE | 80-85 |
| Azobisformamide (ABFA) | 0-8 |
| Azodicarbonamide (ADCA) | 0-8 |
| Calcium carbonate | 1.5-2.5 |
| Anti-oxidant | 0.75-1.5 |
| Color | 3-5 |

The properties of the IXPE cushioning underlayer appear in Table 2 below:

TABLE 2

| IXPE Properties | |
|---|---|
| Item | Property |
| Thickness | 0.9-2.25 mm |
| Density | 0.085-0.115 g/cm$^3$ |
| Water absorption | ≤0.01% |
| Elongation: | |
| (i) Length | 150-190% |
| (ii) Width | 145-190% |
| Tensile Strength: | |
| (i) Length | 0.7-1.1 Mpa |
| (ii) Width | 0.5-1.0 Mpa |

The underlayment 256 thus provides the floor member 200 with excellent water resistance, sound insulation, and heat insulating properties in addition to its cushioning function. The underlayment 256, which can be embossed at the bottom surface, also helps to accommodate subfloor imperfections, and is approximately 1.5 to 2.5 mm thick and preferably approximately 2.0 mm thick.

In assembling or joining a plurality of floor members 200 together the edge joining means 224 (FIG. 14) of one floor member 200 is connectable at one edge such as the edge 232 (FIG. 12) of the one floor member 200 to the complementary edge joining means 226 (FIG. 14) of a first adjacent floor member 200 to form a connection between the one floor member 200 and the first adjacent floor member 200 (FIG. 15).

When the edge joining means 224 and 226 are engaged to lock two adjacent floor members 200 together, the flexible plastic connection 250 also engages the recess 252 (FIGS. 14 and 15) to provide a supplemental locking connection between the two connected floor members 200.

In a similar fashion the edge joining means 224 at a second edge such as the edge 234 (FIG. 12) of the one floor member 200 is connectable to the complementary edge joining means 226 of a second adjacent floor member 200 to form a second locking connection between the one floor member 200 and the second adjacent floor member 200, such as shown in FIG. 13.

In further similar fashion the edge joining means 226 (FIGS. 12 and 14) of the one floor member 200 is joinable at a third edge such as the edge 242 (FIG. 12) of the one floor member 200 to the complementary edge joining means 224 of a third adjacent floor member 200 to form another locking connection between the one floor member 200 and the third adjacent floor member 200.

And lastly, the edge joining means 226 (FIGS. 12 and 14) at a fourth edge such as the edge 244 (FIG. 12) of the one floor member 200 is joinable to the complementary edge joining means 224 of a fourth adjacent floor member 200 to form another locking connection between the one floor member 200 and a fourth adjacent floor member 200, and so on. In this manner a floating floor assembly 260 (FIG. 13) of the floor members 200 can be easily installed on a floor base (not shown).

Because the core layer 216 (FIG. 14) is a closed cell foam construction it has a density that is generally less than the density of solid plastic or solid non-plastic materials. The relatively low density of the core layer 216 enables the floor member 200 to have a greater thickness and less overall weight than that of known dimensionally similar laminated floor planks formed of solid plastic or wood composite layers. The floor member 200 can thus be made thicker, lighter and sturdier than floor members formed exclusively of solid laminated plastic materials.

All layers 202, 204, 208, 210, 216 and 256 of the floor member 200 as shown in FIGS. 11 and 14 are formed of water resistant and water repellant materials such that the floor member 200 is not susceptible to moisture related warpage or other types of water damage, problems that can occur if the floor member is placed on a floor base that is subject to relatively high humidity levels, moisture condensation or if the floor base is an avenue of moisture penetration. Such warpage and water damage can occur with floor members that have non-plastic components.

The overall thickness of the floor member 200 is defined as the distance between the ceramic bead layer 204 (FIG. 14) at the top of the floor member 200 and the bottom surface of the underlayment 256. The core layer 216 has a preferred thickness of 5 mm that is preferably at least 50% of the overall thickness of the floor member 200. Under this arrangement the floor member 200 is relatively thick and sturdy, but relatively lightweight as compared to equally dimensioned floor planks formed exclusively of solid laminated plastic materials.

Figure 16:
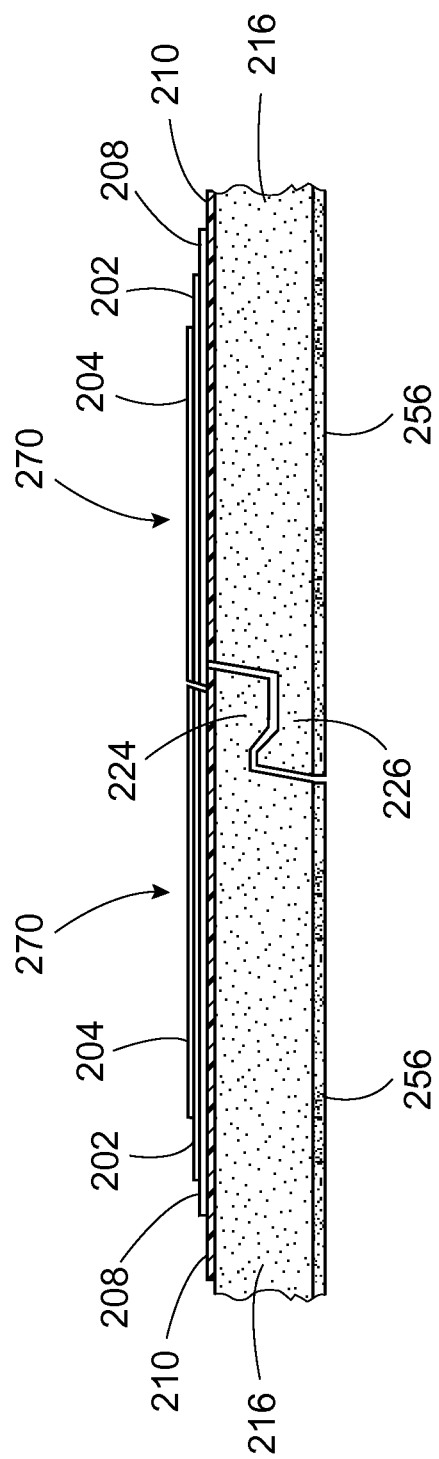
FIG. 16 is a view similar to FIG. 14 showing another embodiment of the invention.

A sixth illustrative embodiment of the invention is a floor member generally indicated by the reference number 270 in FIG. 16.

The floor member 270 is structurally similar to the floor member 200 of FIGS. 11-15. However, the floor member 270 does not include the supplemental locking system represented by the stub-like projection 250 and the recess 252 (FIGS. 14 and 15). The mechanical connection between adjacent floor members 270 by interengagement of the first connection means 224 and the second connection means 226 (FIG. 16) is an effective connection or locking system. The supplemental locking system 250, 252 of FIGS. 14 and 15 is thus an optional feature of the invention.

The floor member 270 is mechanically connectable to other adjacent floor members 270 (not shown) in a manner similar to that previously described for connecting adjacent floor members 200 together. A floating floor assembly (not shown) of the floor members 270 provides all of the water resistant qualities of the floor covering previously described for the floor member 200.

Applicant has found that the approximate 5.0 mm thickness of the core layer 216 is an optimum thickness that permits optional use of the supplemental locking system 250, 252 in the floor member 200 without compromising the integrity of the core layer 216.

Furthermore, the 50% thickness ratio of the 5.0 mm core layer 216 relative to the overall thickness of the floor members 200 or 270 permits economical manufacture of the floor members 200 and 270 with the closed-cell pvc foam as compared to a wood-based core layer or a non-foam core layer.

Under this arrangement, the floor members 200 and 270 are relatively lightweight for their thickness and easy to handle during installation. The floor member with foam core as disclosed herein does not require special skills or training to handle and install, making it attractive for do-it-yourself individuals who have had no previous experience installing floor planks.

As various changes can be made in the above constructions and methods without departing from the scope of the invention, it is intended that all matter contained in the above description or shown in the accompanying drawings shall be interpreted as illustrative and not in a limiting sense.

What is claimed is:

1. A floor member comprising,
    a) a generally rectangular wilt having a top surface, a bottom surface, a predetermined overall thickness and opposite edge portions,
    b) a core layer of closed cell pvc foam plastic material with a toughening agent such that said core layer is impact resistant and is of lower density and lighter weight than a solid pvc material of similar dimension, said core layer having an upper foam surface and a lower foam surface and a uniform density throughout the core layer from the upper foam surface to the lower foam surface,
    c) a non-foam plastic layer provided on the upper foam surface of said core layer,
    d) a display or design layer provided over the non-foam plastic layer,
    e) a clear vinyl wear layer and a protective transparent plastic coating provided over the design layer, such that said design layer shows through said clear vinyl wear layer and said protective transparent plastic coating and said protective transparent plastic coating constitutes the top surface of said floor member,
    f) a resilient polyethylene foam layer provided at the lower surface of said core layer, and said resilient polyethylene foam layer having a bottom surface constituting the bottom surface of said floor member,
    g) joining means provided at the opposite edge portions of said floor member to permit joining of said floor member to other said floor members in adjacent edge-to-edge contact,
    h) said floor member having an overall thickness defined between the top surface and the bottom surface of said floor member, and
    i) said core layer having a thickness that is approximately 50 percent of the overall thickness of said floor member.

2. The floor member as claimed in claim 1 wherein said joining means include a mechanical locking formation extending along two intersecting edges of said floor member and a complementary mechanical locking formation extending along the other two intersecting edges of said floor member to enable said floor member to be mechanically joined together in edge-to-edge, adjacent contact with other said floor members.

3. The floor member as claimed in claimed 2 further including supplemental locking means comprising a flexible plastic protrusion at one of said mechanical and complementary mechanical locking formations and a complementary recess at the other of said mechanical and complementary mechanical locking formations, said flexible plastic protrusion engaging said complementary recess when the mechanical locking formation and the complementary mechanical locking formations on two of said floor members are interengaged.

4. The floor member as claimed in claim 1 wherein the thickness of the core layer is approximately 5.0 mm.

5. The floor member as claimed in claim 1 wherein the non foam plastic layer is made of solid vinyl.

6. The floor member as claimed in claim 5 wherein multiple layers of solid vinyl constitute the non-foam plastic layer.

7. The floor member as claimed in claim 5 wherein the overall thickness of the solid vinyl is approximately 3.0 mm.

8. The floor member as claimed in claim 1 wherein the thickness of the resilient underlayment is approximately 2.0 mm.

9. The floor member as claimed in claim 8 wherein the bottom surface of the resilient underlayment is embossed.

10. The floor member as claimed in claim 1 wherein the layers d) and e) are embossed to embellish the natural appearance of the floor member and provide the floor member with surface traction.

11. The floor member as claimed in claim 5 wherein the thickness of the core layer is approximately 5.0 mm, the thickness of the solid vinyl layer is approximately 3.0 mm and the thickness of the resilient underlayment is approximately 2.0 mm such that the core layer thickness is approximately 50% of the overall thickness of said floor member.

12. The floor member as claimed in claim 1 wherein said floor member is an elongated rectangle approximately eight inches wide and four feet long.

13. A method of preparing a floor member for a floating floor installation on a floor base comprising,
   a) forming a generally rectangular floor member unit having a top surface, a bottom surface, a predetermined overall thickness and opposite edge portions, the overall thickness of the floor member being defined between the top surface and the bottom surface of said floor member,
   b) providing the floor member with a core layer of closed cell pvc foam plastic material with a toughening agent such that said core layer is impact resistant and is of lower density and lighter weight than a solid pvc material of similar dimension, said core layer having an upper foam surface and a lower foam surface, and providing the core layer with a uniform density throughout the core layer from the upper foam surface to the lower foam surface,
   c) providing a non-foam plastic layer on the upper foam surface of the core layer,
   d) providing a display or design layer over the non-foam plastic layer,
   e) providing a clear vinyl wear layer and a protective transparent plastic coating over the design layer, such that said design layer shows through the clear vinyl wear layer and the protective transparent plastic coating and the protective transparent plastic coating constitutes the top surface of the floor member,
   f) bonding a resilient polyethylene foam layer to the lower surface of said core layer, wherein the resilient polyethylene foam layer has a bottom surface that constitutes the bottom surface of the floor member,
   g) providing joining means at the opposite edge portions of said floor member to permit joining of the floor member to other said floor members in adjacent edge-to-edge contact, and
   h) forming the core layer with a thickness that is approximately 50 percent of the overall thickness of the floor member.

14. The method of claim 13 including forming the joining means with a mechanical locking formation that extends along two intersecting edges of the floor member and a complementary mechanical locking formation that extends along the other two intersecting edges of said floor member to enable said floor member to be mechanically joined together in edge-to-edge, adjacent contact with other said floor members.

15. The method of claim 14 including providing supplemental locking means comprising a flexible plastic protrusion at one of said mechanical and complementary mechanical locking formations and a complementary recess at the other of said mechanical and complementary mechanical locking formations, wherein the flexible plastic protrusion engages the complementary recess when the mechanical locking formation and the complementary mechanical locking formations on two of the floor members are interengaged.

16. The method of claim 13 including forming the non-foam plastic layer of solid vinyl.

17. The method of claim 16 including forming the core layer with a thickness of approximately 5.0 mm, forming the solid vinyl layer with a thickness of approximately 3.0 mm and forming the resilient underlayment with a thickness of approximately 2.0 mm such that the core layer thickness is approximately 50% of the overall thickness of the floor member.

18. The method of claim 13 including embossing the layers d) and e) to embellish the natural appearance of the floor member and provide the floor member with surface traction.

19. The method of claim 13 including forming the floor member as an elongated rectangle approximately eight inches wide and four feet long.

20. The method of claim 13 including embossing the bottom surface of the resilient underlayment.

* * * * *

UNITED STATES PATENT AND TRADEMARK OFFICE
CERTIFICATE OF CORRECTION

| | | |
|---|---|---|
| PATENT NO. | : 9,643,377 B2 | Page 1 of 1 |
| APPLICATION NO. | : 14/846407 | |
| DATED | : May 9, 2017 | |
| INVENTOR(S) | : Jincheng Song et al. | |

It is certified that error appears in the above-identified patent and that said Letters Patent is hereby corrected as shown below:

In the Specification

Column 3, Line 6:
Change "fill" to --full--

In the Claims

Column 14, Line 17:
(Claim 1, Line 2) Change "wilt" to --unit--

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*